United States Patent
Ishii

(10) Patent No.: US 8,810,693 B2
(45) Date of Patent: Aug. 19, 2014

(54) IMAGE PROCESSING APPARATUS AND METHOD THEREOF

(75) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 13/411,944

(22) Filed: Mar. 5, 2012

(65) Prior Publication Data

US 2012/0257088 A1 Oct. 11, 2012

(30) Foreign Application Priority Data

Apr. 11, 2011 (JP) .................................. 2011-087702

(51) Int. Cl.
*H04N 5/217* (2011.01)

(52) U.S. Cl.
USPC ......... 348/241; 348/222.1; 348/251; 382/284

(58) Field of Classification Search
USPC ............ 348/241, 218.1, 222.1, 251; 382/284, 382/299
See application file for complete search history.

(56) References Cited

U.S. PATENT DOCUMENTS

| | | | |
|---|---|---|---|
| 6,205,259 B1 * | 3/2001 | Komiya et al. ............... | 382/284 |
| 7,646,932 B1 * | 1/2010 | Peterson ....................... | 382/284 |
| 7,751,618 B2 | 7/2010 | Matsuura | |
| 2007/0237423 A1 * | 10/2007 | Tico et al. ..................... | 382/284 |

FOREIGN PATENT DOCUMENTS

| | | | |
|---|---|---|---|
| JP | 2004-139219 A | 5/2004 | |
| JP | 2007-081580 A | 3/2007 | |

* cited by examiner

*Primary Examiner* — Paul Berardesca
(74) *Attorney, Agent, or Firm* — Fitzpatrick, Cella, Harper & Scinto

(57) ABSTRACT

A plurality of image data obtained by divided-capturing an object and correction image data obtained by capturing a correction chart at an angle of view wider than that in the divided capturing are input. Heterogeneity of luminance in the plurality of image data is corrected based on the correction image data. Joined image data representing the entire image of the object is generated by joining the plurality of image data in which the heterogeneity of luminance has been corrected.

12 Claims, 14 Drawing Sheets

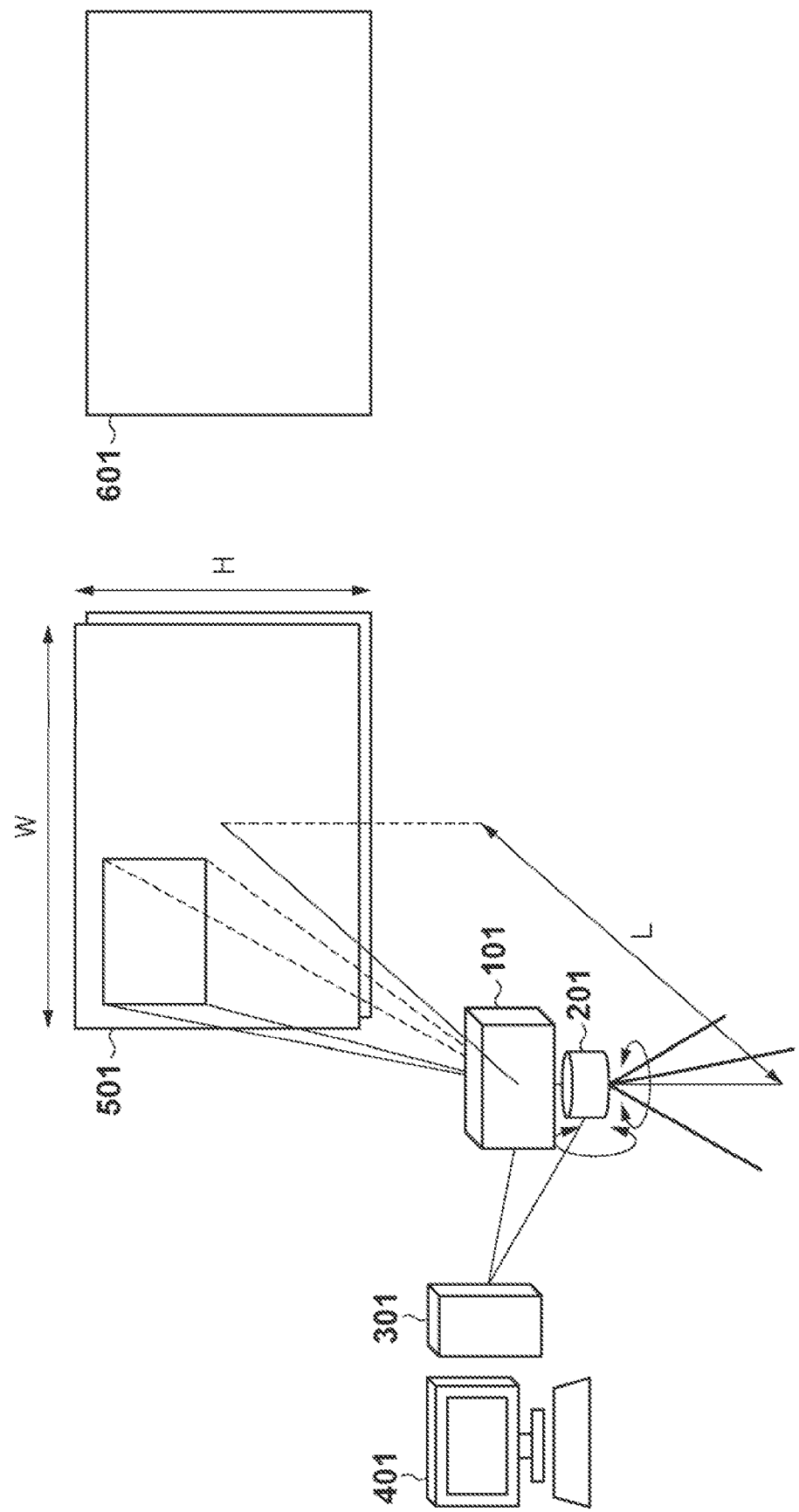

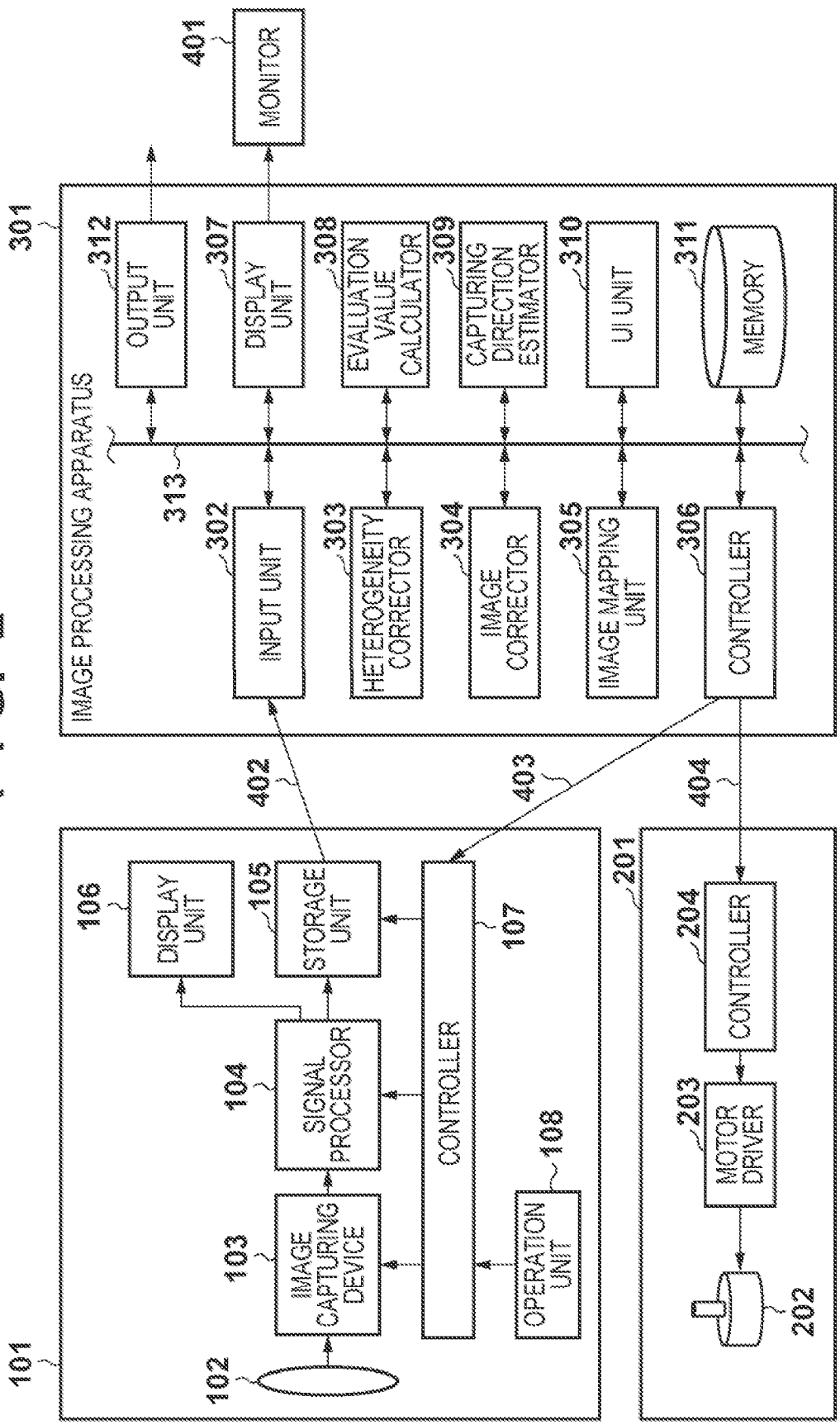

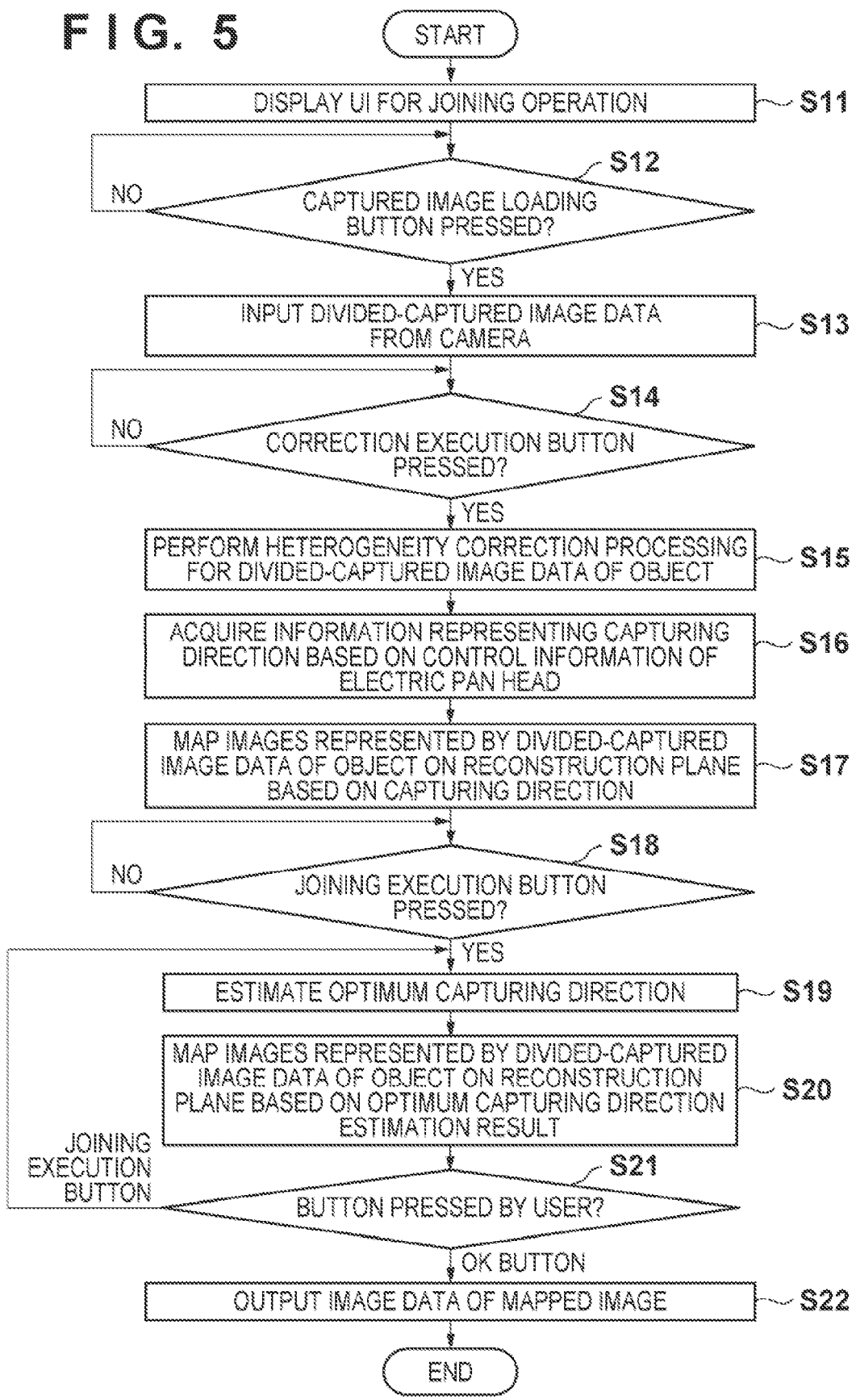

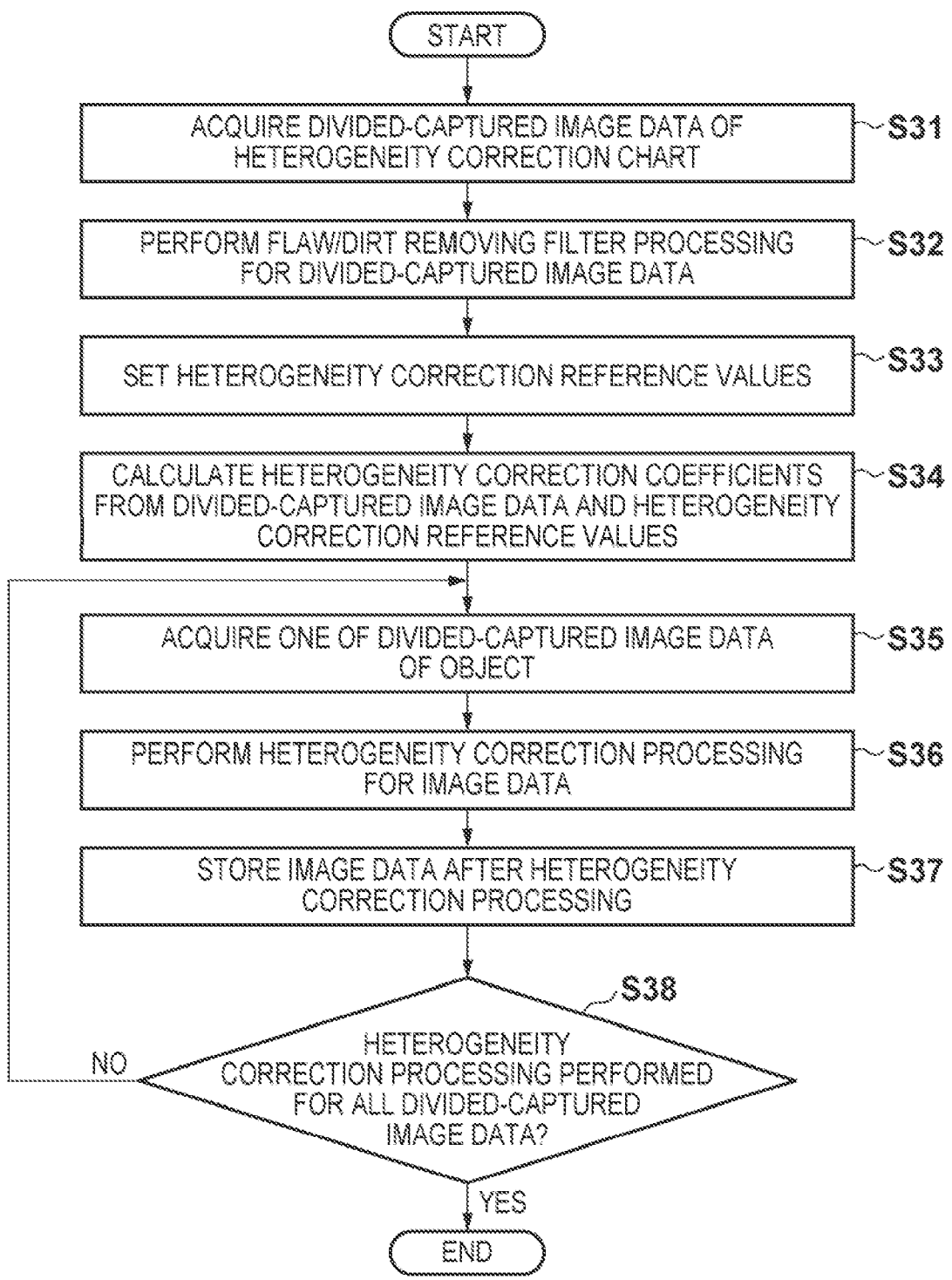

IMAGE PROCESSING APPARATUS AND METHOD THEREOF

BACKGROUND OF THE INVENTION

1. Field of the Invention

The present invention relates to image processing of performing divided capturing of an object to generate image data representing the image of the whole object.

2. Description of the Related Art

To obtain a high-resolution image of an object, a system has received a great deal of attention which performs divided capturing of an object that is divided into a plurality of areas and joins the divided-captured images to generate an image having a very high resolution.

To join the divided-captured images, an overlap area where the captured images overlap each other is extracted, and the plurality of images are joined based on the overlap area. If the captured images include heterogeneity in such joining, no satisfactory joining result is obtained.

There roughly exist two kinds of "heterogeneity" included in the captured images: "heterogeneity of illumination" that occurs due to uneven illumination light for the object and "heterogeneity of vignetting" that makes the peripheral portion of a captured image darker than the center portion because of the lens characteristics. The heterogeneity of illumination readily occurs when the object size is particularly large. When images captured under illumination with large heterogeneity of illumination are joined, an image with large heterogeneity of luminance is obtained. The heterogeneity of vignetting occurs in each captured image. For this reason, a luminance difference is generated in each overlap area between the captured images, resulting in an unnatural joint.

Japanese Patent Laid-Open No. 2004-139219 (literature 1) proposes a method of correcting heterogeneity of vignetting of each captured image so as to obtain a natural joint between the images when joining a plurality of captured images. Although heterogeneity of illumination in a plurality of captured images is not corrected, Japanese Patent Laid-Open No. 2007-081580 (literature 2) proposes a method of capturing a color chart and a heterogeneity-of-illumination correction chart under the same illumination to remove the heterogeneity of illumination of the color chart, thereby calculating highly accurate color processing parameters.

In the method proposed in literature 1, the coefficients to be used to correct the heterogeneity of vignetting are expressed as a linear combination of known functions of image plane coordinates, and the linear combination constant is calculated by the statistical method. This method can correct heterogeneity of vignetting in each captured image to obtain a natural joint between the images but not heterogeneity of illumination remaining in the whole image after joining.

The method proposed in literature 2 corrects heterogeneity of illumination in an actual captured image using actual capturing data of the heterogeneity-of-illumination correction chart. However, since the method does not assume application to joining of divided-captured images, there is no description about correcting heterogeneity of illumination from a plurality of captured images of the heterogeneity-of-illumination correction chart. Hence, correcting heterogeneity of illumination when joining a plurality of captured images cannot be achieved only by the method proposed in literature 2.

SUMMARY OF THE INVENTION

In one aspect, an image processing apparatus comprising: an input section, configured to input a plurality of image data obtained by divided-capturing an object and correction image data obtained by capturing a correction chart at an angle of view wider than an angle of view in the divided capturing; a corrector, configured to correct heterogeneity of luminance in the plurality of image data based on the correction image data; and a generator, configured to generate joined image data representing the object by joining the plurality of image data after the correction.

According to the aspect, it is possible to, when joining divided-captured images, reduce heterogeneity of illumination in the entire joined image and suppress an unnatural joint in the overlap area between the images.

Further features of the present invention will become apparent from the following description of exemplary embodiments with reference to the attached drawings.

BRIEF DESCRIPTION OF THE DRAWINGS

FIG. 1 is a view for explaining the outline of a capturing system according to an embodiment.

FIG. 2 is a view for explaining the arrangement of the capturing system.

FIG. 5 is a flowchart for explaining the joining processing.

FIG. 7 is a flowchart for explaining processing of a heterogeneity corrector.

DESCRIPTION OF THE EMBODIMENTS

Figure 3A:
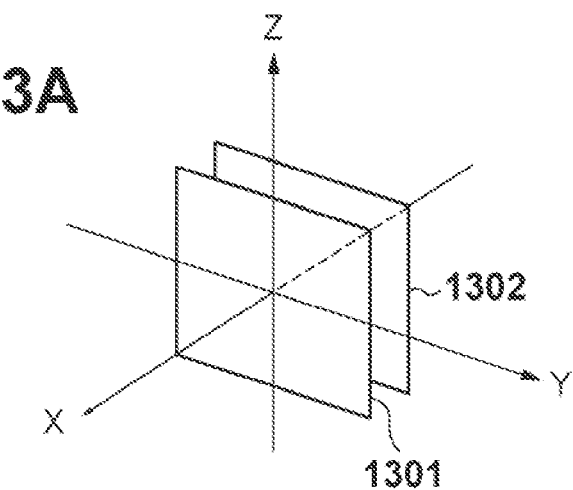
FIGS. 3A and 3B are views for explaining the outline of joining processing.

Image processing according to an embodiment of the present invention will now be described in detail with reference to the accompanying drawings.

First Embodiment

[Outline of Capturing System]

The outline of a capturing system according to an embodiment will be described with reference to FIG. 1.

A camera 101 that is a capturing device main body is attached to an electric pan head 201. The camera 101 can capture an object 501 while changing the direction (to be referred to as a capturing direction hereinafter) of the optical axis of the imaging optical system by pan and tilt. An image processing apparatus 301 controls the operation of the camera 101 and the operation of the electric pan head 201 and displays, for example, an image captured by the camera 101 on a monitor 401. The image processing apparatus 301 also joins a plurality of images (to be referred to as an image group hereinafter) obtained by capturing, thereby generating a high-resolution image of the object 501.

The object 501 has a width W and a height H and is placed at a position spaced apart from the camera 101 by a distance L. A heterogeneity correction chart 601 has a size equal to or larger than the size of the object 501 and includes a uniform, for example, white plane.

[Arrangement of Capturing System]

The arrangement of the capturing system will be explained with reference to the block diagram of FIG. 2.

The camera 101 forms an image of light from the object 501 on an image capturing device 103 such as a CCD (Charge Coupled Device) or a CMOS sensor via an imaging optical system 102. A signal processor 104 performs predetermined processing for an analog electrical signal output from the image capturing device 103 to generate digital image data and stores it in a storage unit 105. A display unit 106 such as an LCD (Liquid Crystal Display) displays an image represented by captured image data or image data stored in the storage unit 105. A controller 107 controls the operation of the camera 101 in accordance with the operation of an operation unit 108 having a shutter button and the like or an externally input control signal.

A controller 204 of the electric pan head 201 controls a motor driver 203 in accordance with an externally input control signal, thereby controlling rotation of a stepping motor 202. Pan and tilt of the camera 101 are thus implemented.

An input unit 302 of the image processing apparatus 301 inputs, via a serial bus 402 such as a USB (Universal Serial Bus) or IEEE1394, image data stored in the storage unit 105 of the camera 101. An output unit 312 outputs image data of a joining result (to be referred to as joined image data hereinafter) to a recording medium, a server apparatus connected to a network, or the like.

A heterogeneity corrector 303 corrects heterogeneity generated in a captured image of the object 501. An image corrector 304 corrects divided-captured images. An image mapping unit 305 maps the divided-captured images on a plane.

A controller 306 controls the other components via a system bus 313. The controller 306 also outputs, for a serial bus or a wired or wireless serial communication channel 403 or 404, a control signal representing a capturing instruction to the camera 101 or a rotation angle instruction to the electric pan head 201 and stores the control information in a predetermined area of a memory 311.

A display unit 307 generates an image signal to be supplied to the monitor 401. An evaluation value calculator 308 calculates the evaluation value of the overlap area between divided-captured images. A capturing direction estimator 309 estimates an optimum capturing direction. A user interface (UI) unit 310 generates an UI to obtain an instruction necessary for image joining processing. The memory 311 such as a RAM (Random Access Memory) stores various data such as image data, events in progress of arithmetic processing, control information, and the like.

The image processing apparatus 301 performs divided capturing of the object 501 and the heterogeneity correction chart 601, which are divided into a plurality of areas, by controlling the camera 101 and the electric pan head 201. Details will be described later. At this time, the controller 306 controls the electric pan head 201 to form an overlap area between a captured image and an adjacent captured image. The controller 306 controls to capture the object 501 and the heterogeneity correction chart 601 under the same capturing conditions of the camera 101 and the same rotation angle of the electric pan head 201. Note that the condition needs to be the same even for illumination light for capturing the object 501 and the heterogeneity correction chart 601. In other words, it is necessary to capture the object 501 and the heterogeneity correction chart 601 under the same illumination.

The heterogeneity corrector 303 calculates heterogeneity correction coefficients from the captured images of the heterogeneity correction chart 601. The image corrector 304 corrects heterogeneity in the captured images of the object 501. The image mapping unit 305 joins the divided-captured images of the object 501 after the heterogeneity correction so as to generate a high-resolution image in which neither heterogeneity in the entire image (to be referred to as a joined image hereinafter) of the joining result nor an unnatural joint in the overlap area between the divided-captured images exists.

[Joining Processing]

Outline of Joining Processing

The outline of joining processing will be described with reference to FIGS. 3A and 3B. Note that in the following explanation, an object such as a picture that can be approximated by a plane is used for the sake of simplicity, and the plane that approximates the object will be referred to as an "object plane". If the object shape is known in advance, forming an object plane conforming to the object shape enables to apply the joining processing of the embodiment.

The object is assumed to be a plane. In this case, an object plane 1301 with the object assumed on a virtual three-dimensional space can be set, as shown in FIG. 3A. An image can be arranged by mapping a captured image on the object plane 1301. FIG. 3A illustrates a reconstruction plane 1302 parallel to the object plane 1301. However, the planes need not always be parallel. FIG. 3B illustrates the three-dimensional space viewed from the z-axis direction for the sake of simplicity. The angle made by the object plane 1301 and each arranged captured image is determined by the position of the camera 101 at the time of capturing.

Figure 3B:
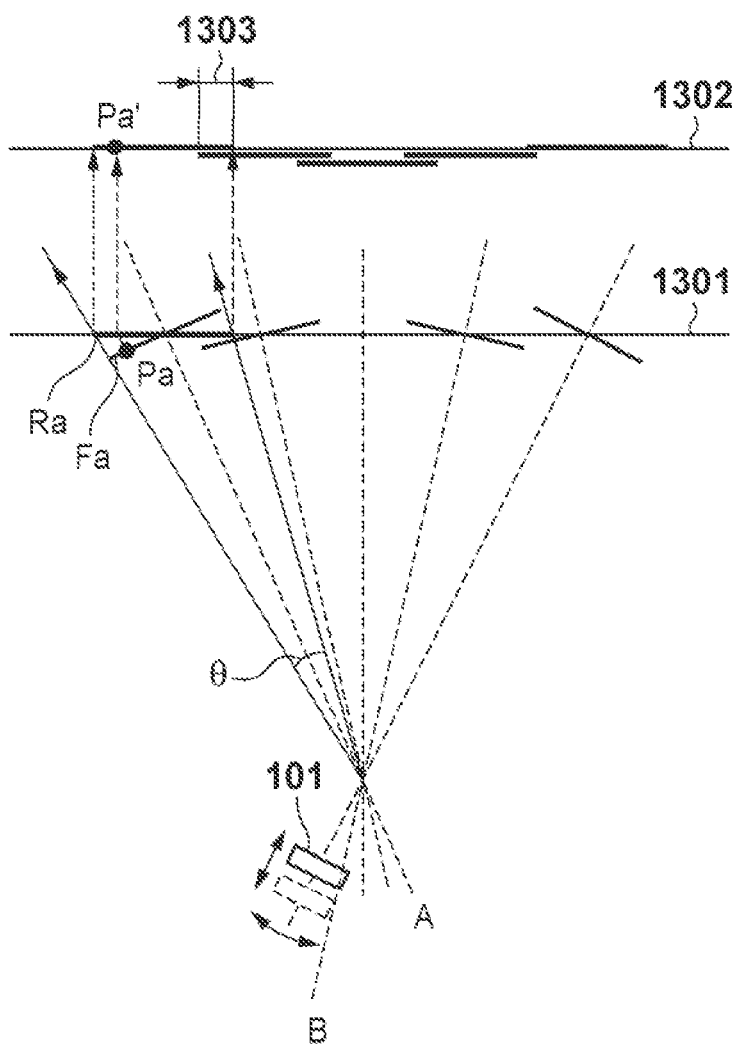

For example, assuming that capturing is performed such that the object is targeted from a position A and focused at the center of the viewfinder, a virtual focal plane Fa shown in FIG. 3B can be set based on an angle θ of view of the capturing lens. The virtual focal plane Fa is a plane on which the camera 101 focuses. Out of the scene of the object viewed from the camera 101, an area including the virtual focal plane Fa is included in the captured image. In this case, the camera 101 whose capturing direction is represented by the line A does not directly face the object plane 1301. The actual object range in the captured image is a capturing range Ra.

Perspective correction processing is performed to set the reconstruction plane 1302 shown in FIGS. 3A and 3B and obtain an object image from such a viewpoint at an infinite position from the object that makes the direction of line of sight directly face the reconstruction plane 1302. Object images that have undergone the perspective correction processing are juxtaposed to obtain a joined image. A thus obtained image will be referred to as a "mapped image" hereinafter. For example, assume that there is no lens distortion for the sake of simplicity. A point Pa' on the reconstruction plane 1302 corresponds to a point Pa on the object plane 1301 based on the distance between the object and the camera 101 at the position A and the angle θ of view at the time of capturing. That is, the pixel value of the point Pa should match that of the point Pa'. However, since image data obtained by capturing is digitized bitmap data, the coordinate values of the point Pa are not necessarily integer values. If the coordinate values of the point Pa are not integer values, the pixel value of the point Pa' is calculated by interpolation processing of neighboring pixels.

Figure 4A:
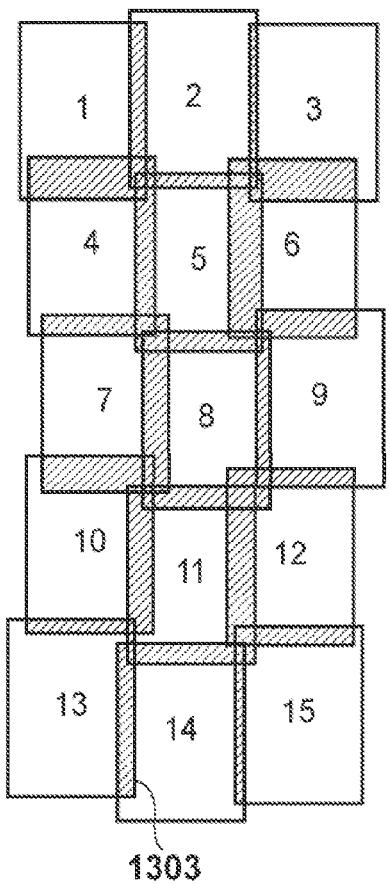
FIGS. 4A to 4C are views showing an example of mapped images.
Figure 4B:
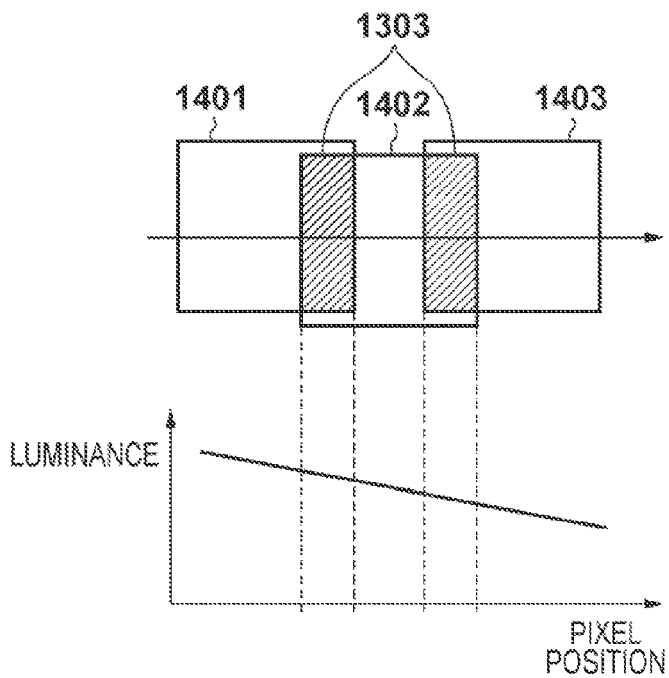
Figure 4C:
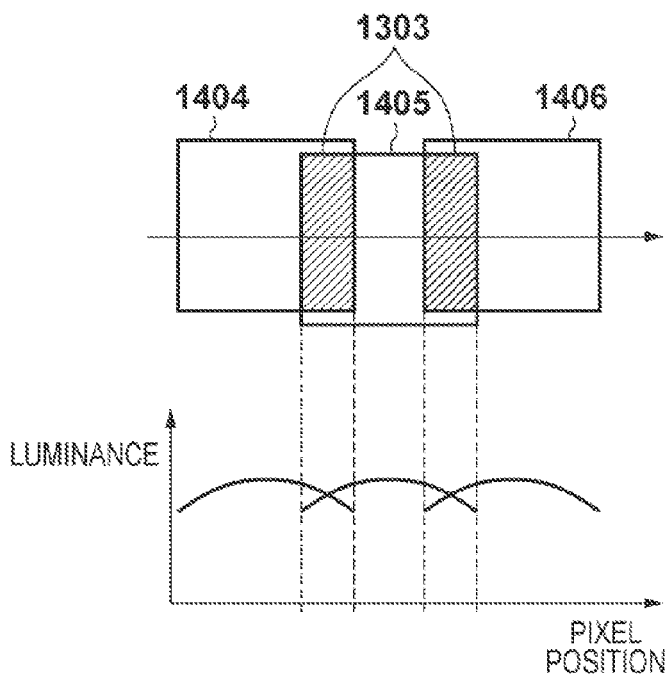

FIGS. 4A to 4C show an example of mapped images. FIG. 4A shows the mapped images of a total of 15 divided-captured images obtained by capturing an object divided into five parts in the X direction and three parts in the Y direction. Overlap areas 1303 are formed between the mapped images.

FIG. 4B shows an example of heterogeneity of luminance that occurs in a captured image due to heterogeneity of illumination at the time of capturing when the reflection characteristic is uniform (for example, the object is a uniform white plane) throughout the object, and the captured image has no heterogeneity of vignetting. That is, FIG. 4B shows heterogeneity of illumination that occurs in images 1401, 1402, and 1403 when illumination is done from the direction of the captured image 1401. As shown in FIG. 4B, when heterogeneity of illumination exists, the image luminance lowers in the order of the images 1401, 1402, and 1403. For this reason, the joined image also has the heterogeneity of illumination.

FIG. 4C shows an example of heterogeneity of vignetting that occurs in a captured image in accordance with the lens characteristic when the object is a uniform white plane, and the captured image has no heterogeneity of illumination. That is, heterogeneity of luminance that makes the luminance at the peripheral portion lower than that at the center portion occurs in each of captured images 1404, 1405, and 1406. Hence, luminance discontinuity occurs in the overlap areas 1303.

It is necessary to correct the heterogeneity of illumination and the heterogeneity of vignetting in the captured images and join the corrected images so as to obtain a joining result including no heterogeneity of illumination in the entire joined image and an excellent joint between the images. Instead of directly changing the relative positions of the captured images arranged on the three-dimensional space, the joining processing needs to be performed while estimating an optimum capturing direction to minimize the error of the overlap areas 1303, when executing joining.

Joining Processing Procedure

Joining processing will be described with reference to the flowchart of FIG. 5. Note that the processing shown in FIG. 5 is executed under the control of the controller 306.

Figure 6:
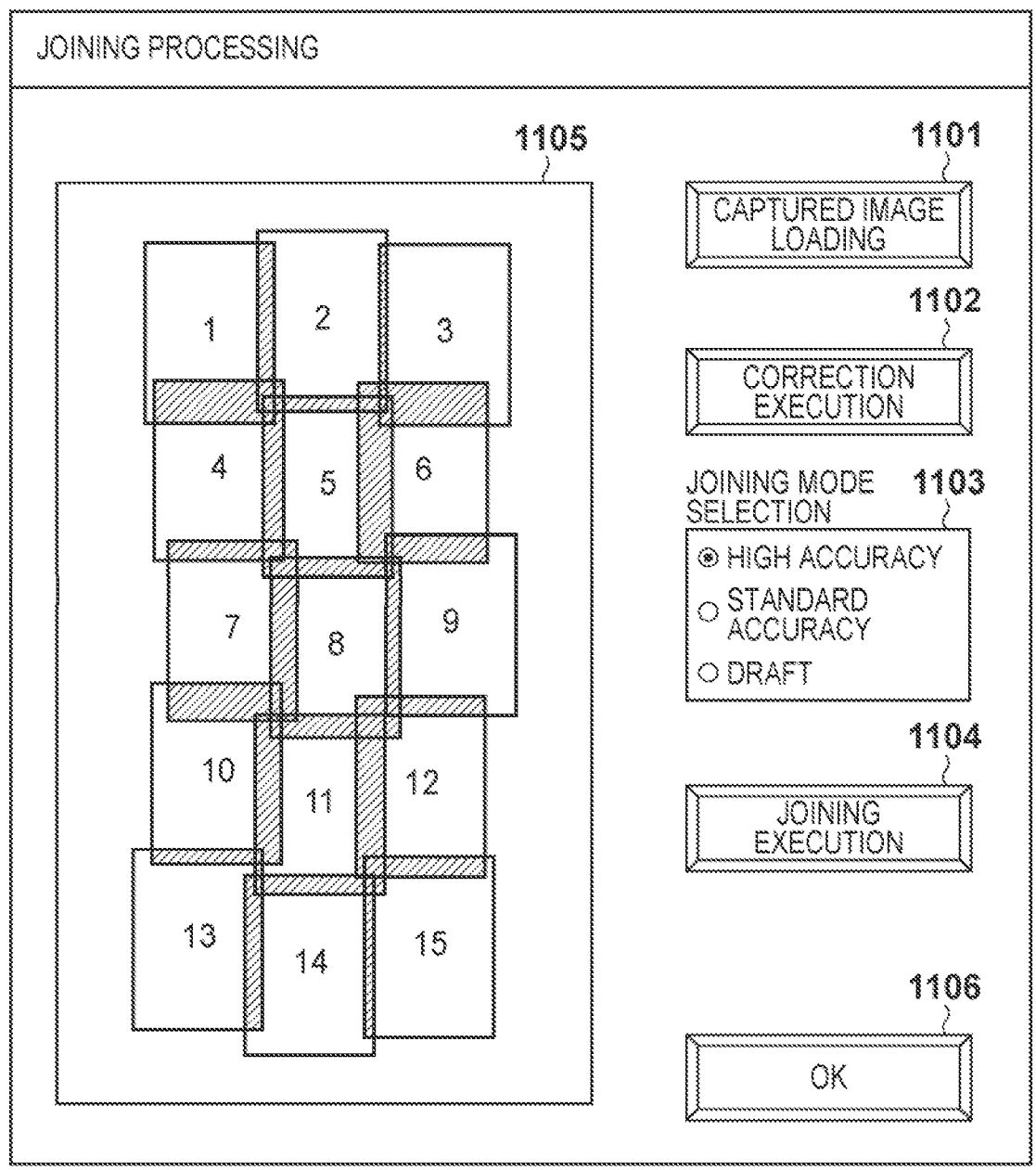
FIG. 6 is a view showing an example of a UI.

The controller 306 controls the UI unit 310 and the display unit 307 to display a UI for the captured image joining operation on the monitor 401 (S11). FIG. 6 shows an example of the UI. When the user presses a "captured image loading" button 1101 (S12), the controller 306 controls the input unit 302 to input image data from the storage unit 105 of the camera 101 and store the input image data in a predetermined area of the memory 311 (S13). Note that the input image data includes a plurality of image data obtained by divided-capturing the object 501 and a plurality of correction image data obtained by divided-capturing the heterogeneity correction chart 601.

When the user presses a "heterogeneity correction execution" button 1102 (S14), the controller 306 controls the heterogeneity corrector 303 to perform heterogeneity correction processing for the divided-captured image data of the object 501 and store the corrected image data in a predetermined area of the memory 311 (S15). Details will be described later.

Next, the controller 306 acquires, from the memory 311, control information of the electric pan head 201 upon divided-capturing of the input image data and supplies the control information to the capturing direction estimator 309, thereby acquiring capturing direction information from the capturing direction estimator 309 (S16).

The controller 306 then controls the image mapping unit 305 to map images represented by the divided-captured image data of the object 501 stored in the memory 311 onto the reconstruction plane 1302 in accordance with the capturing direction information (S17). Note that the mapped images are displayed in a window 1105 of the UI.

When the user presses a "joining execution" button 1104 (S18), the controller 306 controls the capturing direction estimator 309 to estimate an optimum capturing direction (S19). The controller 306 then controls the image mapping unit 305 to map the images represented by the divided-captured image data of the object 501 stored in the memory 311 onto the reconstruction plane 1302 in accordance with the optimum capturing direction estimation result (S20). Note that the mapped images are displayed in the window 1105 of the UI.

Next, the controller 306 determines the button pressed by the user (S21). When the user presses the "joining execution" button 1104, the process returns to step S19. When the user presses an "OK" button 1106, the controller determines that a mapped image desired by the user has been obtained, and controls the output unit 312 to output the image data of the mapped image to an output destination designated by the user (S22). The joining processing thus ends. Note that to reexecute the joining processing, the user, for example, changes the selection of a joining mode selector 1103 of the UI and then presses the "joining execution" button 1104.

Heterogeneity Corrector

Processing (S15) of the heterogeneity corrector 303 will be described with reference to the flowchart of FIG. 7.

The heterogeneity corrector 303 acquires the divided-captured image data of the heterogeneity correction chart 601 for the memory 311 (S31) and performs, for the acquired divided-captured image data, filter processing of removing flaws and dirt on the heterogeneity correction chart 601 (S32). This filter processing is done using, for example, 5×5 median filter. A moving average filter, a weighted average filter, a Gaussian filter, or the like is also usable.

Next, the heterogeneity corrector 303 calculates, as heterogeneity correction reference values, average values Rave, Gave, and Bave of the RGB values of the entire captured image data after the filter processing of the heterogeneity correction chart 601 (S33). Note that another statistic value such as the maximum value, median, or mode of the RGB values of the entire captured image may be used as the heterogeneity correction reference value.

The heterogeneity corrector 303 then calculates heterogeneity correction coefficients by the following equations based on the heterogeneity correction reference values and the captured image data after the filter processing of the heterogeneity correction chart 601 (S34). That is, the heterogeneity corrector 303 calculates heterogeneity correction coefficients that make the RGB values of each point of the divided-captured image data of the object 501 approach the heterogeneity correction reference values.

$$Rk(n,x,y)=Rave/Rcht(n,x,y)$$

$$Gk(n,x,y)=Gave/Gcht(n,x,y)$$

$$Bk(n,x,y)=Bave/Bcht(n,x,y) \quad (1)$$

where (n, x, y) represents a point (x, y) of nth captured image data,

Xk is the heterogeneity correction coefficient of the X color component,

Xcht is the value of the X color component of the captured image data of the heterogeneity correction chart 601, and X is R, G, or B.

The heterogeneity corrector 303 then acquires one of the divided-captured image data of the object 501 from the memory 311 in, for example, the capturing order (S35) and performs heterogeneity correction processing for the acquired image data (S36) by $$Ro(n,x,y)=Rk(n,x,y)\times Ri(n,x,y)$$

$$Go(n,x,y)=Gk(n,x,y)\times Gi(n,x,y)$$

$$Bo(n,x,y)=Bk(n,x,y)\times Bi(n,x,y) \quad (2)$$

where Xi is the value of the X color component before heterogeneity correction, and Xo is the value of the X color component after heterogeneity correction.

Next, the heterogeneity corrector 303 stores the image data after the heterogeneity correction processing in a predetermined area of the memory 311 (S37). Until it is determined in step S38 that all the divided-captured image data of the object 501 have undergone the heterogeneity correction processing, the processing in steps S35 to S37 is repeated.

Capturing Direction Estimator

When the capturing direction is set according to the control information of the controller 306, capturing direction estimation is unnecessary. However, installation errors of the camera 101 and the object 501, errors caused by control errors of the electric pan head 201, and the like exist between the control information and the actual capturing direction. To estimate the correct capturing direction, the capturing direction estimator 309 gradually changes the capturing direction and estimates the capturing direction in which the error in the overlap area between the captured images is minimized.

To estimate the capturing direction, a solution needs to be searched for the shift of rotation and tilt of the camera 101. When the solution is searched from a wide area, the calculation load is heavy. To prevent this, the search area is divided to narrow down the solution search area. After the search area has come sufficiently small, the optimum solution is searched, thereby speeding up the capturing direction search.

Figure 8A:
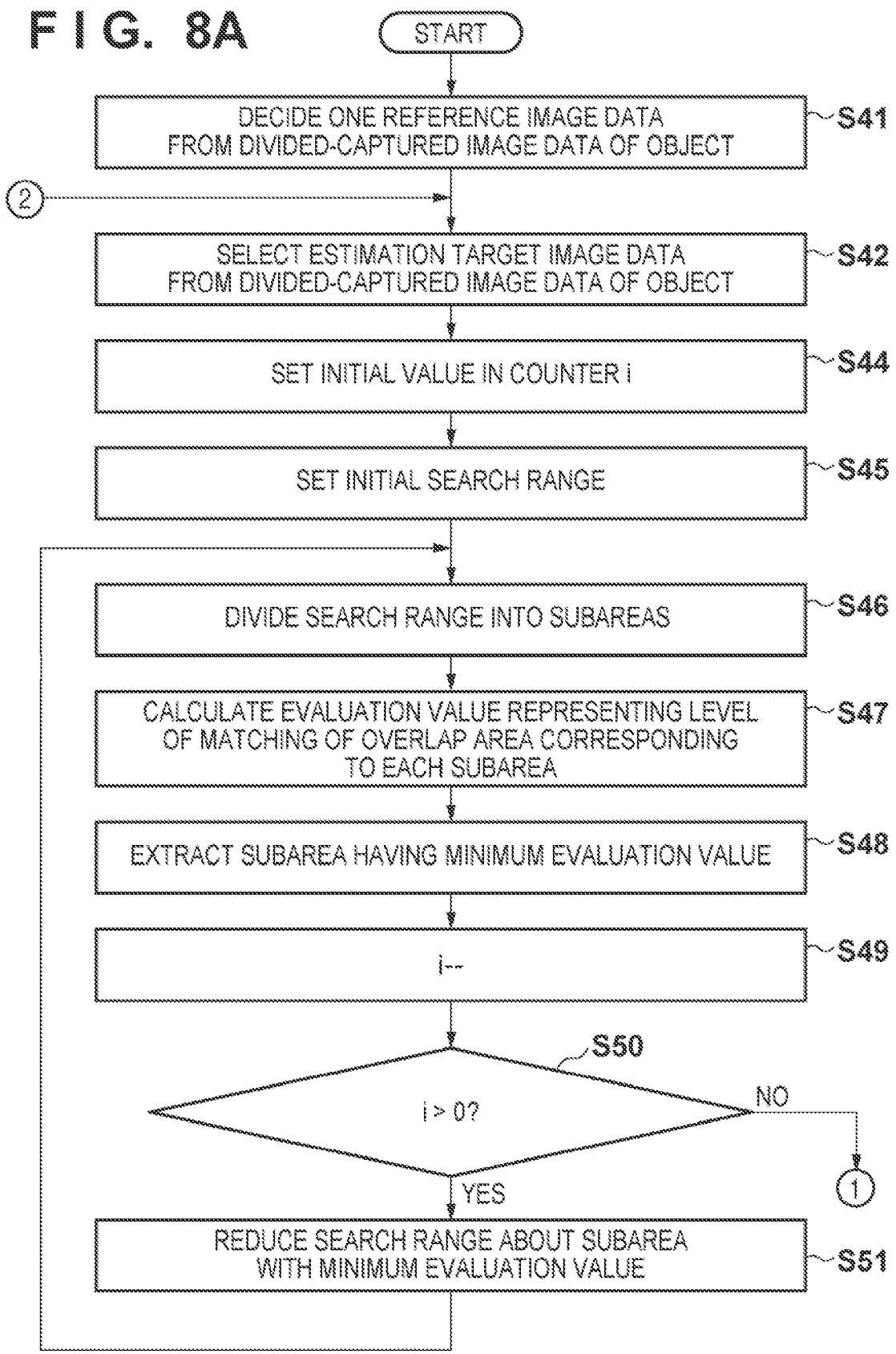
FIGS. 8A and 8B are flowcharts for explaining processing of a capturing direction estimator.
Figure 8B:
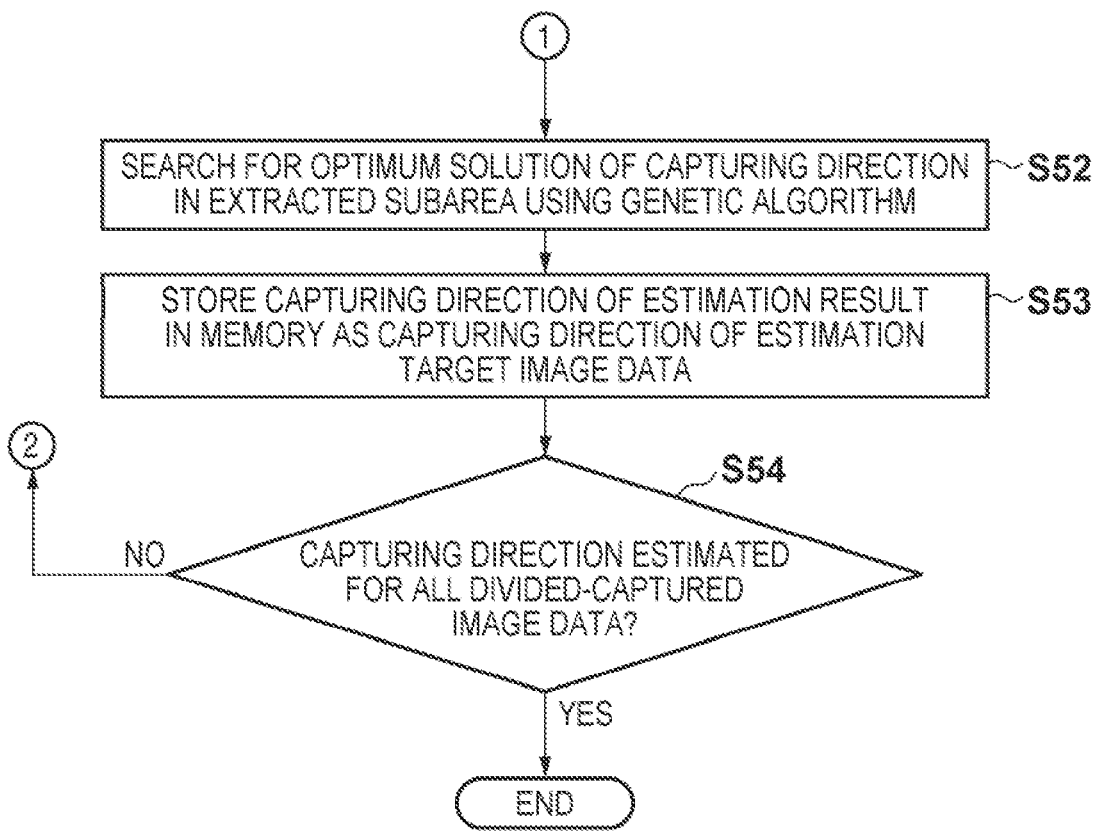

Processing of the capturing direction estimator 309 (S19) will be described with reference to the flowcharts of FIGS. 8A and 8B. The capturing direction estimator 309 decides one reference image data from the divided-captured image data of the object 501 (S41). For example, image data captured at the home position is used as the reference image data. Alternatively, the capturing distance of each image data may be acquired from the control information of the electric pan head 201, and image data with the minimum capturing distance may be used as the reference image data.

Figure 9:
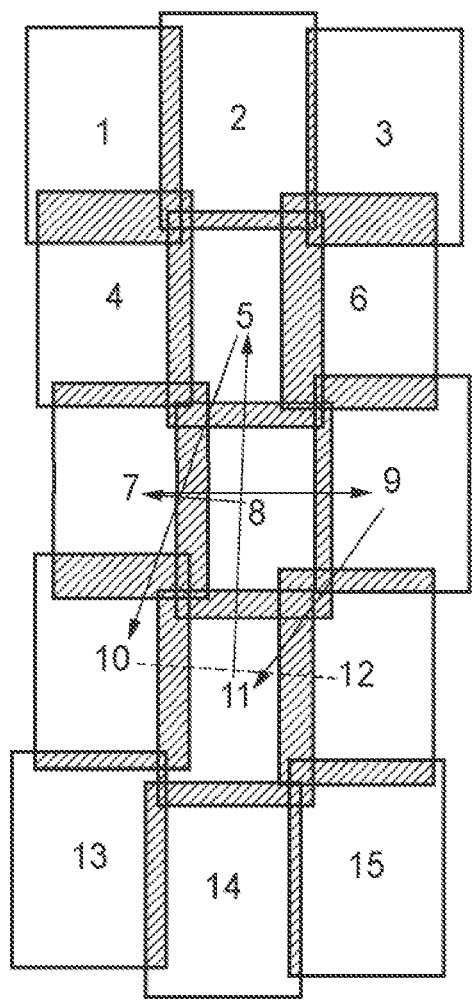
FIG. 9 is a view for explaining an example of image data selection order.

Next, the capturing direction estimator 309 selects, from the divided-captured image data of the object 501, image data (to be referred to as estimation target image data hereinafter) for which capturing direction estimation processing is performed (S42). An example of the image data selection order will be explained with reference to FIG. 9. For example, when image 8 is the reference image data, the images are selected in the ascending order of the distance between the center and that of image 8. The image data of the selected image is the estimation target image data. In the example shown in FIG. 9, the image data are selected in the order of image 8, image 7, image 9, image 11, image 5, image 10, image 12, . . . .

The capturing direction estimator 309 sets the initial value (for example, 5) in a counter i (S44) and sets the initial value of the range (to be referred to as a search range hereinafter) to search for the capturing direction in accordance with selection of a radio button of the joining mode selector 1103 of the UI (see FIG. 6) (S45). When "high accuracy" is selected in the joining mode selector 1103, for example, ±0.1 is set for the initial search range as the range of the shift of pan and tilt of the camera 101. When "standard accuracy" is selected, for example, ±0.2 is set. When "draft" is selected, for example, ±0.4 is set for the initial search range.

Next, the capturing direction estimator 309 divides the search range into subareas (for example, 24×24) (S46) and calculates an evaluation value representing the level of matching of the overlap area corresponding to each subarea (that is, the shift of pan and tilt of the camera 101) (S47). Note that the evaluation value calculator 308 calculates an evaluation value to be used to evaluate the level of matching of the overlap area between the image of the estimation target image data and each peripheral image, which is generated as the result of mapping processing (S15). Details will be described later.

The capturing direction estimator 309 extracts a subarea where the evaluation value is minimum (S48) and decrements the counter i (S49). The value of the counter i is determined (S50). If the counter i has not reached zero (i>0), the search range is reduced about the subarea where the evaluation value is minimum (S51), and the process returns to step S46. Note that the reduction ratio of the search range is set to, for example, ½ or ¼. That is, reduction of the search range and processing up to extraction of the subarea where the evaluation value is minimal are repeated as many as the number of times initially set in the counter i.

When the counter i reaches zero (i=0), the capturing direction estimator 309 searches for the optimum solution of the capturing direction in the extracted subarea using a genetic algorithm (S52). The capturing direction of the search result (estimation result) is stored in a predetermined area of the memory 311 as the capturing direction of the estimation target image data (S53). Note that the optimum solution search may be done using a neural network. Needless to say, the optimum solution may be searched in the initial search range using a round robin algorithm, instead of performing the search processing in the search range narrowed down by area division.

Next, the capturing direction estimator 309 determines whether the capturing direction estimation is completed for all divided-captured image data (S54). If the estimation is not completed, the process returns to step S42 to repeat the processing in steps S44 to S53 for the next estimation target image data. If the capturing direction estimation is completed for all divided-captured image data, the capturing direction estimation processing ends.

Evaluation Value Calculator

The evaluation value calculation method of the evaluation value calculator 308 will be described with reference to FIGS. 10A and 10B.

Figure 10A:
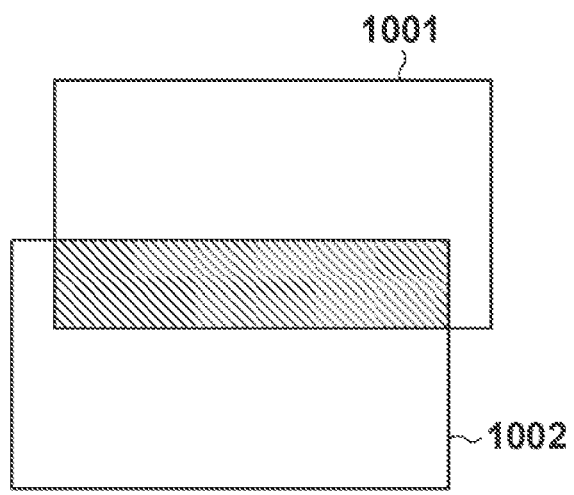
FIGS. 10A and 10B are views for explaining the evaluation value calculation method of an evaluation value calculator.

Assume that two mapped images 1001 and 1002 are arranged as shown in FIG. 10A. Since these images are mapped on the reconstruction plane 1302 under the influence of the perspective and the subtle shift of the capturing direction, the central positions of the images 1001 and 1002 do not coincide at a high probability. In addition, the pixel size (in other words, the distance between the centers of adjacent pixels) may be different.

Figure 10B:
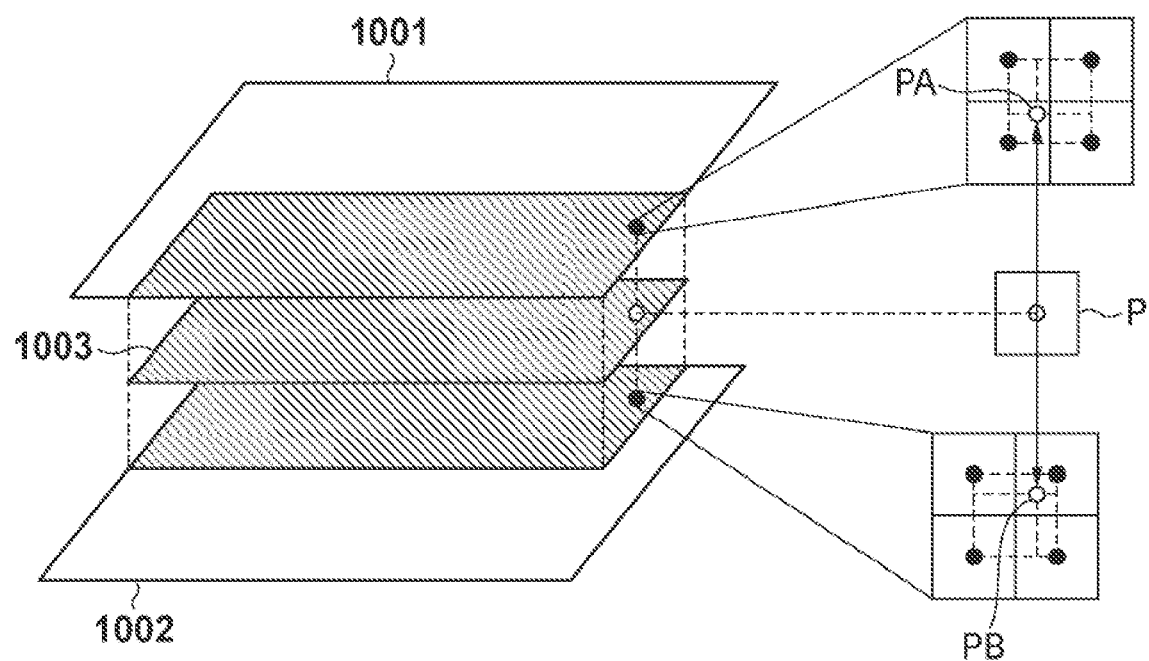

The evaluation value calculator 308 sets a virtual overlap area 1003 between the images 1001 and 1002, as shown in FIG. 10B. The images 1001 and 1002 mapped on the single reconstruction plane 1302 have no space shown in FIG. 10B between them. However, setting the virtual overlap area 1003 makes it possible to compare the slightly shifted pixels. The resolution of the virtual overlap area 1003, which can arbitrarily be set, is set to the average of the pixel sizes of the images 1001 and 1002.

Referring to FIG. 10B, the coordinates on the image 1001 corresponding to a pixel P on the virtual overlap area 1003 are represented by PA, and the coordinates on the image 1002 are represented by PB. The coordinates PA and PB exist at positions shifted from the centers of the pixels on the respective images. Hence, the evaluation value calculator 308 calculates the pixel values of the coordinates PA and PB by interpolation processing of neighboring pixels. In the example shown in FIG. 10B, the pixel values are determined by bilinear interpolation using four neighboring pixels. Bicubic interpolation or the like may be done by increasing the number of neighboring pixels to be referred to.

The evaluation value calculator 308 determines the difference between the calculated pixel values of the coordinates PA and PB as the error amount of the pixel P on the virtual overlap area 1003. The evaluation value calculator 308 calculates the error amounts of all pixels in the virtual overlap area 1003 and sets a means square error MSE of them as an evaluation value representing the level of matching of the overlap area.

Another Heterogeneity Correction Reference Value Calculation Method

An example has been described above in which the heterogeneity correction reference values necessary for calculating heterogeneity correction coefficients are calculated by referring to the entire heterogeneity correction chart 601. However, the heterogeneity correction reference values may be calculated more easily. For example, the heterogeneity correction reference values are calculated using image data including the maximum pixel value and image data including the minimum pixel value out of the divided-captured image data of the heterogeneity correction chart 601.

In step S33, the heterogeneity corrector 303 acquires one image data having a maximum pixel value Vpmax and one image data having a minimum pixel value Vpmin from the captured image data of the heterogeneity correction chart 601 after filter processing. The heterogeneity corrector 303 then calculates, as the heterogeneity correction reference values, the average values Rave, Gave, and Bave of the RGB values of the acquired image data. Note that a pixel value Vp is calculated by $$Vp=\sqrt{(R^2+G^2+B^2)} \quad (3)$$

Alternatively, the G value may be used as the pixel value Vp.

Otherwise, the average luminance value of each of the divided-captured image data may be calculated, and the heterogeneity correction reference values may be calculated from a plurality of image data with top-ranked average luminance values and a plurality of image data with lower-ranked average luminance values.

Another Heterogeneity Correction Coefficient Calculation Method

The above example assumes preparing the heterogeneity correction chart 601 whose size is equal to (or larger than) the size of the object 501. However, it may be impossible to prepare the heterogeneity correction chart 601 having such a size depending on the size of the object 501. Hence, the heterogeneity correction chart 601 that is fully captured within the angle of view of the capturing lens and has a size (to be referred to as the minimum size hereinafter) slightly larger than the angle of view is prepared. A heterogeneity correction coefficient at an arbitrary position is linearly interpolated from the captured image data of the heterogeneity correction chart 601 arranged at a predetermined position.

The heterogeneity correction chart 601 having the minimum size are supposedly arranged at, for example, each of four portions corresponding to the four corners (upper left, upper right, lower left, and lower right positions) of the arrangement area of the object 501. However, the heterogeneity correction chart 601 having the minimum size can be arranged at an arbitrary portion of the arrangement area of the object 501.

The image processing apparatus 301 controls the camera 101 and the electric pan head 201 to perform divided capturing of the object 501 by dividing it into a plurality of parts. The image processing apparatus 301 also captures the heterogeneity correction charts 601 having the minimum size and arranged at the four corners of the object 501. At this time, illumination light upon capturing the object 501 and that upon capturing the heterogeneity correction charts 601 having the minimum size need to be set to the same condition.

In step S33, the heterogeneity corrector 303 calculates, as the heterogeneity correction reference values, the average values Rave, Gave, and Bave of the RGB values of the captured image data of the heterogeneity correction charts 601 after filter processing.

In step S34, the heterogeneity corrector 303 calculates the heterogeneity correction coefficients by equations (1) from the heterogeneity correction reference values and the captured image data of the heterogeneity correction charts 601 after filter processing. Note that the heterogeneity correction coefficients calculated from the heterogeneity correction charts 601 are represented by correction chart arranged at the upper left: Xk(Lt, x, y),
correction chart arranged at the upper right: Xk(Rt, x, y),
correction chart arranged at the lower left: Xk(Lb, x, y),
correction chart arranged at the lower right: Xk(Rb, x, y)
where X is R, G, or B.

In step S34, the heterogeneity corrector 303 also calculates the heterogeneity correction coefficient at an arbitrary position from the heterogeneity correction coefficients of the heterogeneity correction charts 601 by $$Xk(i,j,x,y)=(i-1)/(Nx-1)\times\{H1\times Xk(Rb,x,y)+H2\times Xk(Rt,x,y)\}+(Nx-i)/(Nx-1)\times\{H1\times Xk(Lb,x,y)+H2\times Xk(Lt,x,y)\} \quad (4)$$

where (i, j) is the position of each divided image when the divided-captured image at the upper left is defined as the origin (1,1),
(i, j)=(Nx, Ny) is the position of divided-captured image at the lower right,
H1=(j−1)/(Ny−1),
H2=(Ny−j)/(Ny−1), and
X is R, G, or B According to this calculation method, even when the heterogeneity correction chart 601 having the same size as that of the object 501 cannot be prepared, the heterogeneity correction coefficient at an arbitrary position can be calculated.

As described above, heterogeneity of illumination and heterogeneity of vignetting in divided-captured image data are corrected, and the divided-captured image data after correction are joined. It is therefore possible to generate a high-resolution image in which neither heterogeneity of illumination in the entire joined image nor an unnatural joint in the overlap area between the divided-captured images exists.

Second Embodiment

Image processing according to the second embodiment of the present invention will be described below. Note that the same reference numerals as in the first embodiment denote the same parts in the second embodiment, and a detailed description thereof will be omitted.

If the illumination light amount largely changes during divided capturing of an object 501 under, for example, sunlight, the luminance difference in the overlap area between the divided-captured images may become large to impede obtaining a satisfactory joining result. In the second embodiment, a method of obtaining a satisfactory joining result even when the luminance difference between the divided-captured images is large will be explained.

Figure 11A:
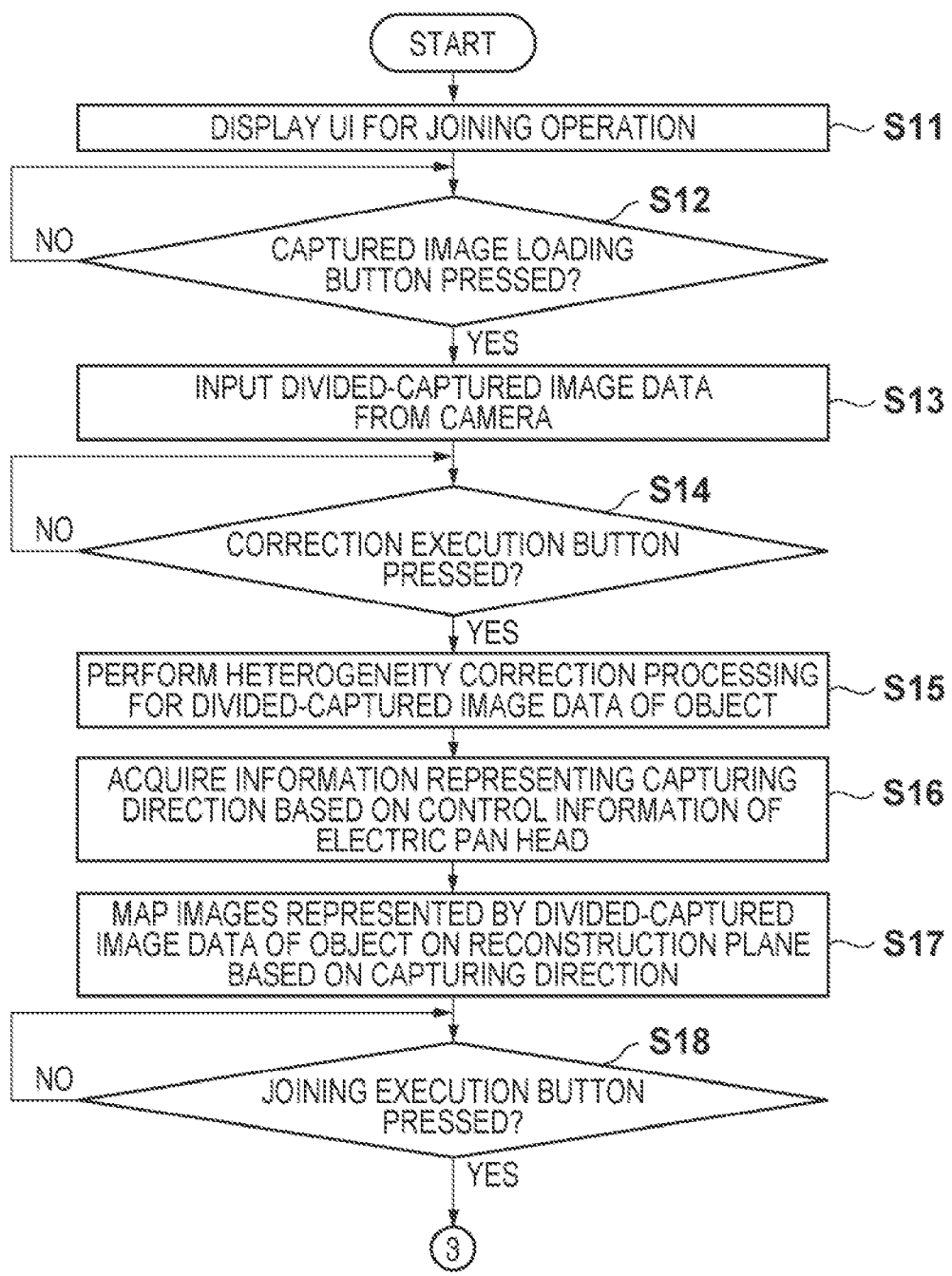
FIGS. 11A and 11B are flowcharts for explaining joining processing according to the second embodiment.
Figure 11B:
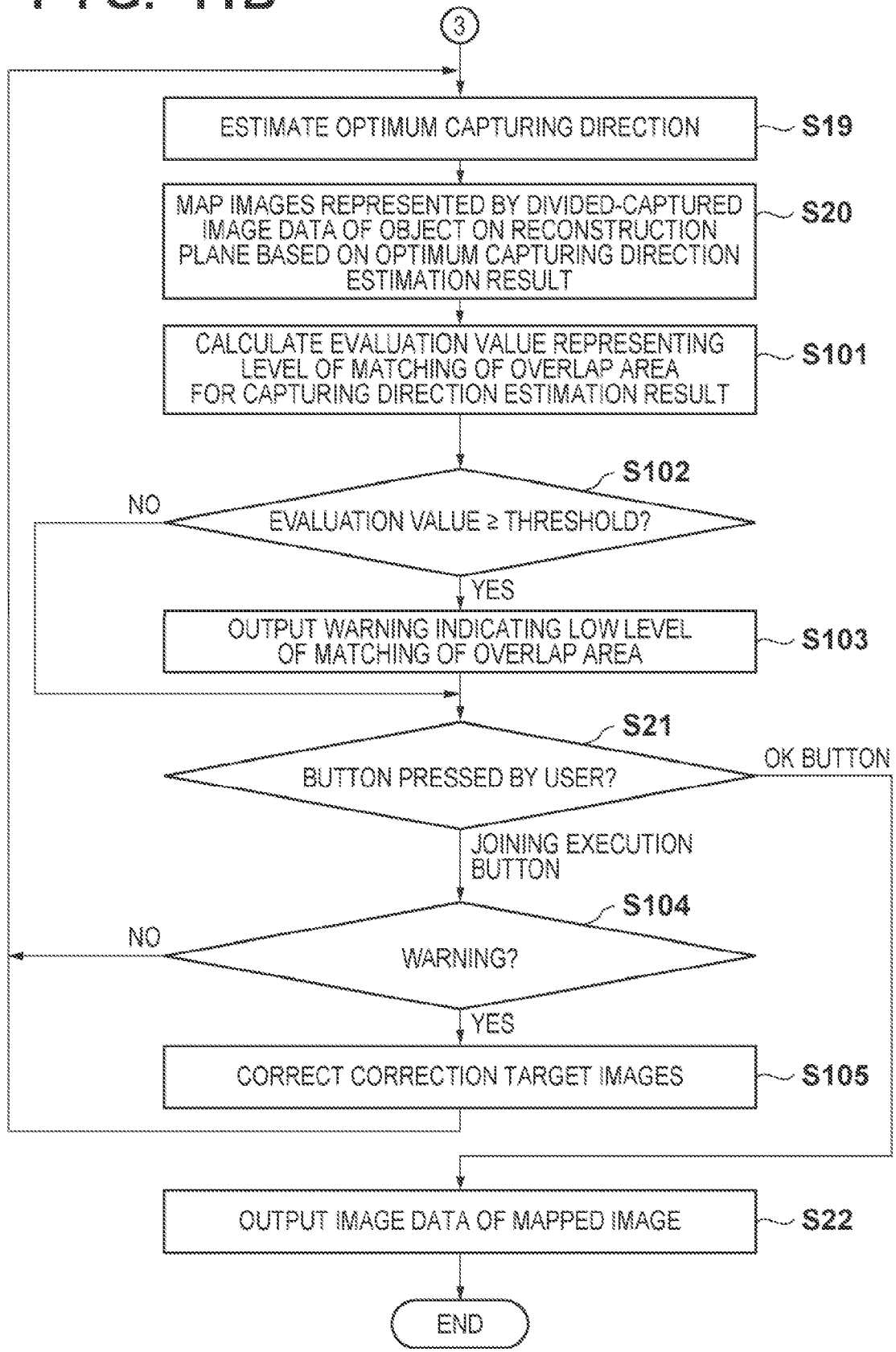

Joining processing according to the second embodiment will be described with reference to the flowcharts of FIGS. 11A and 11B. Note that the processing shown in FIGS. 11A and 11B is executed under the control of a controller 306. The processing in steps S11 to S22 is the same as in the first embodiment, and a detailed description thereof will be omitted.

After the mapped images are displayed in a window 1105 of the UI in step S20, the controller 306 causes an evaluation value calculator 308 to calculate an evaluation value representing the level of matching of the overlap area for the capturing direction estimation result in step S19 (S101). The calculated evaluation value is compared with a predetermined threshold (S102). If the evaluation value is equal to or larger than the threshold (the level of matching is low), the controller 306 warns the user of it (S103).

When warned, the user refers to the images displayed in the window 1105 and presses an "OK" button 1106 if desired images are obtained. The joining processing thus ends. On the other hand, if no desired image is obtained, the user operates a correction target image selector 1107 displayed on the UI together with the warning to select images to be corrected and then presses a "joining execution" button 1104.

Figure 12:
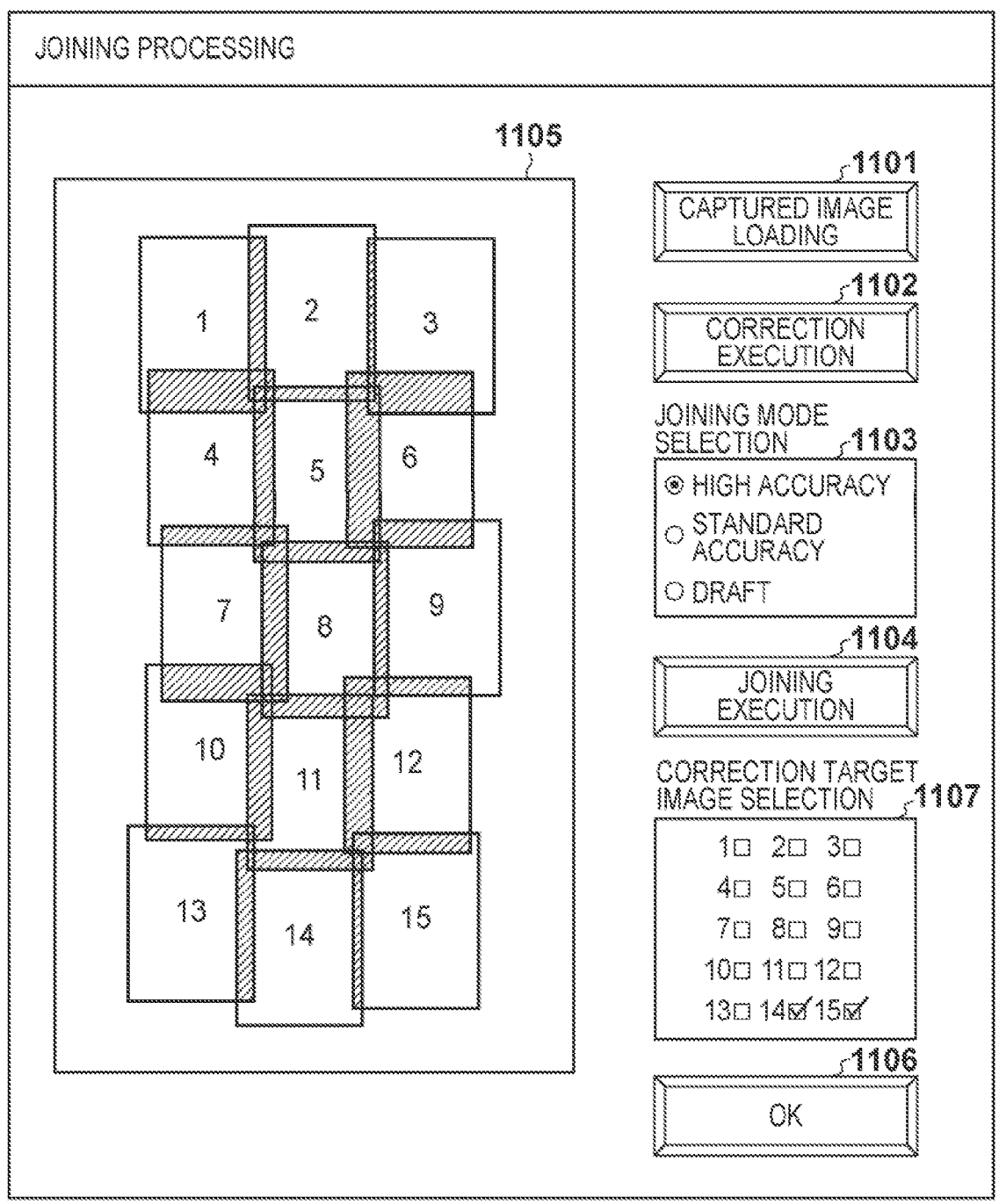
FIG. 12 is a view showing an example of a UI.

FIG. 12 shows an example of the UI. The user selects the correction target images by checking the check boxes of the correction target image selector 1107 corresponding to the badly joined images.

The controller 306 determines the button pressed by the user (S21), and if the "joining execution" button 1104 is pressed, branches the process based on whether a warning has been output (S104). Without a warning, the process returns to step S19, as in the first embodiment. If a warning has been output, the controller 306 controls an image corrector 304 to correct the correction target images (S105), and returns the process to step S19.

The image corrector 304 performs, for example, gamma correction, brightness correction, and contrast correction for the correction target images so as to make the evaluation value representing the level of matching of the overlap area between the correction target images, which is calculated by the evaluation value calculator 308, closer to zero. That is, the image corrector 304 determines a coefficient that sets the evaluation value representing the level of matching of the overlap area to zero and performs image processing of the correction target images. Alternatively, the overlap area may be divided into a plurality of subareas, an evaluation value may be calculated in each subarea, and an index that minimizes the sum of the plurality of evaluation values may be calculated to perform gamma correction of the correction target images. Otherwise, a determinant that minimizes the sum of the plurality of evaluation values may be created, and the correction target images may be processed using the determinant.

Modification of Embodiments

In the above-described example, the heterogeneity correction coefficients are calculated from the pixel values of captured image data. However, image data of the standard RGB space such as sRGB or AdobeRGB may be converted into CIELab values or CIEXYZ values, and the correction coefficients may be calculated from the CIELab values or CIEXYZ values. Note that when the heterogeneity correction coefficients obtained from the CIEXYZ values are applied to the image data of the object, heterogeneity correction processing is performed for the entire object image data converted into the CIEXYZ values. The CIEXYZ values after the heterogeneity correction processing are then converted into RGB values.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-087702, filed Apr. 11, 2011, which is hereby incorporated by reference herein in its entirety.

What is claimed is:

1. An image processing apparatus comprising:
an input section, configured to input a plurality of image data obtained by divided-capturing an object and correction image data obtained by capturing a correction chart at an angle of view wider than an angle of view in the divided capturing;
a corrector, configured to correct heterogeneity of luminance in the plurality of image data based on the correction image data; and
a generator, configured to generate joined image data representing the object by joining the plurality of image data after the correction,
wherein at least one of the input section, the corrector, and the generator is implemented using a processor.

2. The apparatus according to claim 1, wherein the plurality of image data and the correction image data are image data captured under the same illumination.

3. The apparatus according to claim 1, wherein the corrector calculates, from the correction image data, a correction coefficient to be used to correct the heterogeneity of luminance in the plurality of image data and corrects the heterogeneity of luminance in the plurality of image data using the correction coefficient.

4. The apparatus according to claim 3, wherein the corrector calculates, as the correction coefficient, a ratio of a value of each pixel of the correction image data to an average value of values of all pixels of the correction image data.

5. The apparatus according to claim 1, further comprising an acquisition section configured to acquire information representing a capturing direction when a capturing device used for the divided capturing has captured each of the plurality of image data,
wherein the generator joins, based on the information representing the capturing direction, the plurality of image data in which the heterogeneity of luminance has been corrected.

6. The apparatus according to claim 5, wherein the generator comprises:
- a mapping section, configured to map, based on the information representing the capturing direction, images represented by the plurality of image data on a plane set on a virtual three-dimensional space;
- a calculator, configured to calculate an evaluation value representing a level of matching of an overlap area between the images mapped on the plane;
- an estimator, configured to estimate the capturing direction of the plurality of image data based on the evaluation value; and
- a joining section, configured to generate the joined image data by mapping the images represented by the plurality of image data on the plane based on the estimated capturing direction.

7. The apparatus according to claim 1, wherein the heterogeneity of luminance depends on at least one of heterogeneity of illumination and heterogeneity of vignetting.

8. The apparatus according to claim 1, wherein the correction chart has a size not less than a size of the object and has a uniform white plane.

9. The apparatus according to claim 1, wherein the correction chart has a size smaller than a size of the object and larger than an angle of view of a capturing device used for the divided capturing, has a uniform white plane, and is arranged at each of a plurality of positions of an arrangement area of the object.

10. The apparatus according to claim 9, wherein the corrector calculates a ratio of a value of each pixel of the correction image data to an average value of values of all pixels of the correction image data obtained by capturing the correction chart arranged at each of the plurality of positions, and calculates a correction coefficient corresponding to the entire arrangement area of the object from the ratio by linear interpolation.

11. An image processing method comprising the steps of:
- inputting, to an image processing apparatus including at least a processor, a plurality of image data obtained by divided-capturing an object using a capturing device and correction image data obtained by capturing a correction chart at an angle of view wider than an angle of view in the divided capturing;
- correcting heterogeneity of luminance, using the processor, in the plurality of image data based on the correction image data; and
- generating joined image data, using the processor, representing the object by joining the plurality of image data after the correction.

12. A non-transitory computer readable medium storing a computer-executable program for causing a computer to perform an image processing method comprising the steps of:
- inputting a plurality of image data obtained by divided-capturing an object and correction image data obtained by capturing a correction chart at an angle of view wider than an angle of view in the divided capturing;
- correcting heterogeneity of luminance in the plurality of image data based on the correction image data; and
- generating joined image data representing the object by joining the plurality of image data after the correction.

\* \* \* \* \*